United States Patent Office 3,488,361
Patented Jan. 6, 1970

3,488,361
NOVEL SULFONIUM COMPOUNDS AND PROCESS OF PREPARATION THEREOF
Sheldon B. Greenbaum, Tonawanda, N.Y., assignor to Hooker Chemical Corporation, Niagara Falls, N.Y., a corporation of New York
No Drawing. Filed Feb. 11, 1966, Ser. No. 526,916
Int. Cl. C07d 65/00
U.S. Cl. 260—327          11 Claims

ABSTRACT OF THE DISCLOSURE

This invention relates to a compound of the formula

[structure: bicyclic ring with Y substituent and RS(O)$_n$ substituent]

wherein R is selected from the group consisting of alkyl, substituted alkyl, aryl and substituted aryl, $n$ is from 1 to 2 and Y is selected from the group consisting of halogen and $$-S\overset{S}{\underset{\|}{P}}-(OR)_2$$

This case also covers the preparation of these compounds and their utility as chemical intermediates and pesticides.

---

The present invention is concerned with sulfonium compounds, derivatives thereof and processes of preparation thereof. More specifically, in one aspect, the present invention is directed to novel sulfonium compounds of 9-thiabicyclo [3.3.1] nonane which are prepared by reacting the corresponding sulfonium salts at elevated temperatures.

In accordance with the present invention, there are provided the novel compounds as represented by the following structure

[structure: bicyclic ring with Y and RS(O)$_n$ substituents]

wherein R is selected from the group consisting of alkyl, aryl, substituted alkyl and substituted aryl, and Y is selected from the group consisting of halogen and a radical of the formula $$-S\overset{S}{\underset{\|}{P}}-(OR)_2$$

and $n$ is a whole number from 1 to 2. More specifically, the compounds of the present invention can be described by the following structures

[two structures: one with X and RS(O)$_n$; one with S$\overset{S}{P}$(OR)$_2$ and RS(O)$_n$]

wherein X is a halogen atom and R and $n$ are as defined herein.

Among the R radicals encompassed herein are alkyl of from 1 to about 20 carbon atoms, and preferably of from 1 to about 12 carbon atoms, such as methyl, ethyl, propyl, butyl, amyl, octyl, decyl, dodecyl, pentadecyl, eicosyl, as well as their various isomer forms such as isopropyl and isobutyl, said alkyl radical being a monovalent radical derivable from an aliphatic hydrocarbon alkane by the removal of one hydrogen atom; substituted alkyl of from one to about 30 carbon atoms and preferably of from 1 to about 15 carbon atoms, said alkyl group being substituted by one or more of halogens, aryl, substituted aryl, and the like. The designation "AR" or aryl represents an aromatic structure containing from 6 to about 18 carbon atoms, and preferably 6 to about 10 carbon atoms, such as benzene, naphthalene, anthracene, and the like. The aryl nucleus can be substituted by alkyl and substituted alkyl as defined herein. The X substituent embraces halogen atoms such as chlorine, bromine, fluorine and iodine.

Illustrative examples of the novel compounds embraced within the present invention, thus include the following:

[Multiple chemical structures shown:
- Cl-substituted bicycle with CH$_3$SO
- Cl-substituted bicycle with C$_2$H$_5$SO
- Br-substituted bicycle with Cl$_2$-phenyl-SO$_2$
- F-substituted bicycle with CCl$_3$SO
- Cl-substituted bicycle with Cl$_2$-phenyl-SO$_2$
- Br-substituted bicycle with Br$_2$-phenyl-SO
- S—P(OCH$_3$)$_2$ substituted bicycle with CH$_3$SO
- S—P(OC$_2$H$_5$)$_2$ substituted bicycle with CH$_3$—SO$_2$
- S—P(OCH$_3$)(OC$_2$H$_5$) substituted bicycle with BrC$_5$H$_{10}$SO
- S—P(OAr)$_2$ substituted bicycle with CH$_3$SO
- S—P(O-phenyl-Cl$_2$)$_2$ substituted bicycle with phenyl-SO]

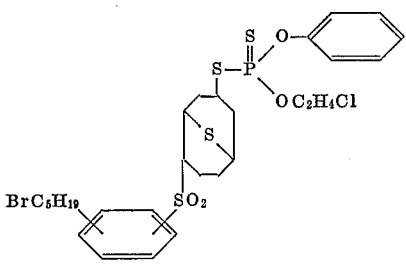

The compounds of the present invention are prepared by heating the novel compound of the formula:

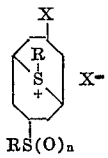

at elevated temperatures followed by isolation of the product of the formula

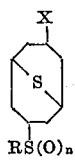

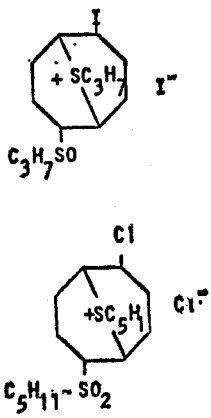

and subsequently thereafter reacting the isolated product above with a compound of the formula, if it is desired to produce a dithiophosphate ester:

wherein Z is an alkali metal and the substituents R, X and n are as defined herein. The temperature utilized to effect the first step in the process generally ranges from about 100 degrees centigrade about 300 degrees centigrade to and preferably is from about 100 degrees centigrade to 200 degrees centigrade. The second step of the process also occurs at elevated temperatures, with the temperature generally being from about 30 degrees centigrade to about 100 degrees centigrade and specifically from about 50 degrees centigrade to about 75 degrees centigrade. Higher and lower reaction temperatures can be used up to about 350 degrees centigrade and below about 75 degrees centigrade. With respect to the other reaction conditions, they can vary over wide ranges and will depend upon the reactants employed, the specific temperature utilized and the yield of product desired. Specifically, a 1 to 1 molar ratio of alkali metal compound

to sulfonium compound is used. Greater and lesser amounts, i.e., up to 5 moles less than 0.5 mole of alkali metal compound can be used if desired.

Examples of the alkali metal which are employed in the process of the present invention include, for example, sodium, potassium, lithium, rubidium, cesium, and the like, with sodium being preferred because it is readily available.

The desired products are separated from the reaction mixtures by a number of methods known in the art such as distillation, fractional distillation, crystallization, extraction, filtration and gas chromatography, with filtration being preferred in the practice of the present invention.

Illustrative examples of the starting reactants which may be utilized in the practice of the present invention include

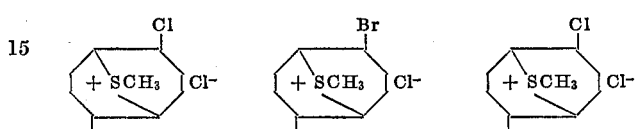

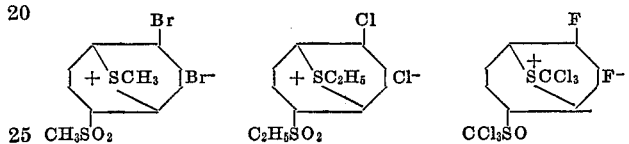

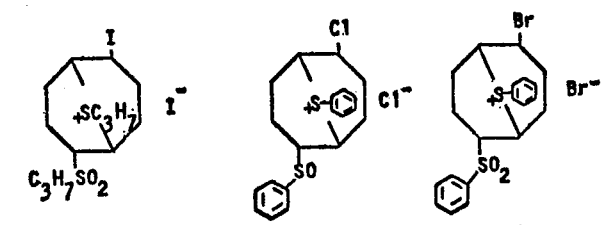

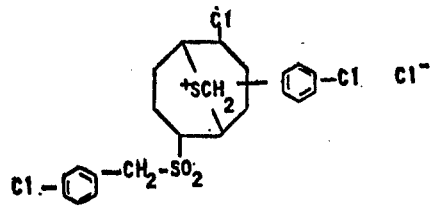

The compounds of the present invention wherein Y is a halogen atom are useful as intermediates in the preparation of the compounds of this invention wherein Y is an alkali metal radical of the formula:

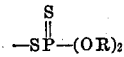

The compounds of this invention wherein Y represents the radical

have utility as pesticides. In general, when the compounds of the present invention wherein Y is the radical SP(OR)$_2$ are employed as pesticides, they will be applied in rates ranging from between about 0.1 pound per acre up to about several hundred pounds per acre, the amount depending upon crop sensitivity, weather conditions and other factors known to those skilled in the art. While these compounds may be utilized as pesticides in the pure form, they may be conveniently employed in the form of formulations which in many instances enhance pesticidal activity. Suitable formulations include for example, solutions of the pesticide compound in a solvent, such as petroleum hydrocarbon, for example, xylene, heavy aromatic naphthas, and the like, and aqueous dispersions or emulsions generally containing surface active agents, such as those listed in "Soap and Chemical Specialties," volume 31, No. 7, pages 50–61, No. 8, pages 48–61, No. 9, pages 52–67 and No. 10, pages 38–67 (1955). Also useful are solid formulations of the compounds of the present invention wherein the solid carriers used are substances, such as talc, silica, vermiculite and clay. This solid formulation may also contain surface active agents, sticking agents, stabilizing agents or binders to facilitate their application. Additionally, these compounds may further be formulated with other pesticides, for example, other fungicides, such as sulfur, the fungicidal dithiocarbamates, nitropolychlorobenzenes, and various other fungicidal compounds containing chlorinated alkyl thio groups, such as mercaptan. Further, the compounds of the present invention may be formulated with insecticides, such as the chlorinated hydrocarbon insecticides, the phosphate insecticides and the carbamate insecticides, and with herbicides, such as sodium chlorate, sodium borate, 2,4-D, the herbicidal triazines, herbicidal ureas, herbicidal uracils. In another aspect, these compounds may be formulated with synergists that serve to enhance their pesticidal activity, for example, piperonyl butoxide, and the like. It is, of course, appreciated that other pesticidal compounds may be used in combination with the compounds in question which may serve to enhance, complement or synergize such compounds.

Specifically, the reaction sequence for the preparation of the phosphorus insecticide is illustrated by the following equations:

I. 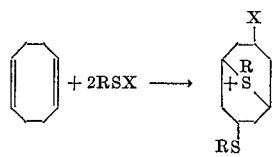

II. 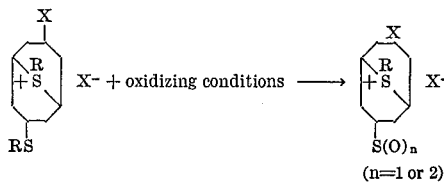

III. 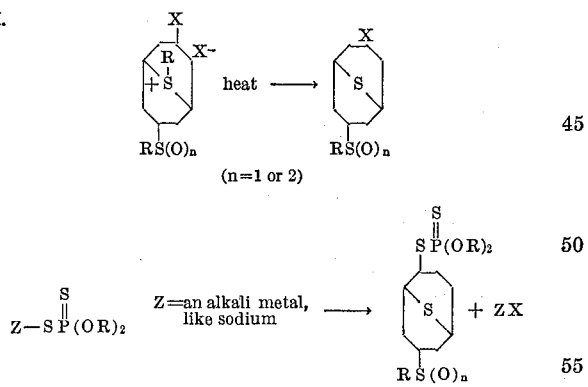

The product as produced in Equation IV is useful as an insecticide.

The following examples are presented to further illustrate the invention, but are not intended to limit its scope. Unless otherwise specified, all temperatures are in degrees centigrade and all parts are by weight.

EXAMPLE 1

Preparation of 2-chloro-6-methylsulfonyl-9-thiabicyclo [3.3.1] nonane

2 - chloro - 4 - methylsulfonyl - 9 - methylthiabicyclo [3.3.1] nonanium chloride was gradually heated to 155 degrees centrigrade. At this temperature the melt began to effervesce as it lost methyl chloride. When the bubbling had ceased, the residue was cooled and taken up in a minimum of benzene. Dilution with hexane afforded a colorless crystalline product which was further crystallized from a mixture of glyme (ethylene glycol dimethyl ether) and hexane. The product had a melting point at 105–106 degrees centigrade.

Analysis.—Calculated for $C_9H_{15}ClO_2S_2$: Cl, 13.9%; S, 25.1%. Found: Cl, 12.7%; S, 25.0%.

EXAMPLE 2

2-(0,0-diethoxythiophosphinothioyl)-6-methylsulfonyl-9-thiabicyclo[3.3.1] nonane A solution of 5.1 grams of 2 - chloro - 6 - methylsulfonyl - 9 - thiabicyclo[3.3.1] nonane in 50 milliliters of ethylene glycol dimethyl ether was treated by the drop wise addition of 4.2 grams of the sodium salt of 0,0-diethylphosphorodithioic acid dissolved in 25 milliliters of the same solvent. The mixture was then heated to between 50 degrees centigrade and 60 degrees centigrade for ore-half hour. The mixture was cooled and the salt was removed by filtration. The solvent was removed at the aspirator and replaced with benzene. The benzene solution was washed with water, dried over anhydrous magnesium sulfate and stripped carefully with a good oil pump. The compound was a yellow oil.

Analysis.—Calculated for $C_{13}H_{25}O_4PS_4$: P, 7.7%; S, 31.7%. Found: P, 7.2%; S, 29.0%.

In a manner similar to Examples 1 and 2, that is utilizing the reaction conditions and procedures of these examples, the following compounds are prepared from the corresponding reactants.

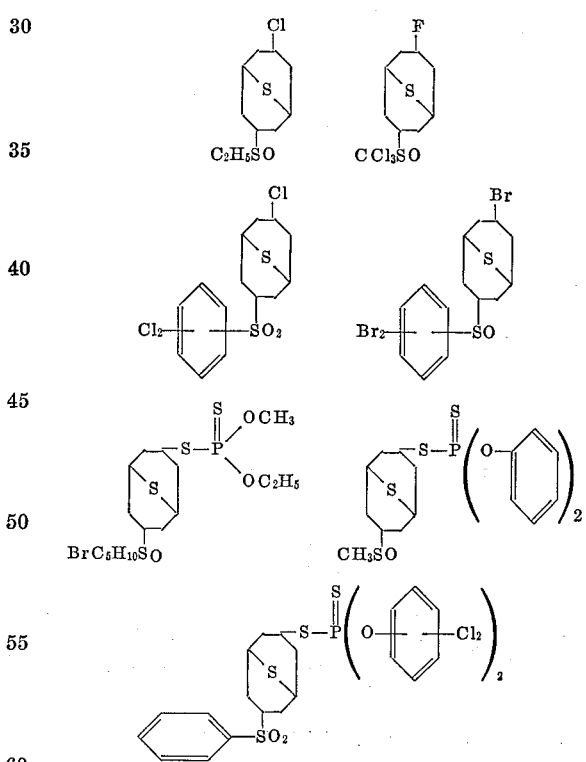

EXAMPLE 3

The effectiveness in destroying Mexican Bean Beetles and mites was established by applying the compound

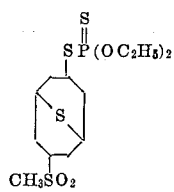

to about 50 to 100 adult mites and about 10 to about 25 Mexican bean beetles at various concentrations; the number of dead insects were counted. The results were as follows:

| | | | | |
|---|---|---|---|---|
| Mexican bean beetle, percent mortality | 100 | 100 | 100 | 100 |
| Mites, percent mortality | 100 | | | 100 |
| Concentration, percent | 0.1 | 0.05 | 0.025 | 0.1 |

Similarly, the corresponding derivatives are tested in the same manner with substantially the same results. These derivatives include among others,

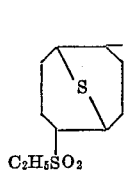
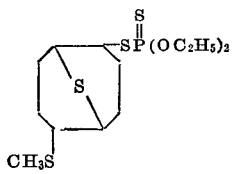

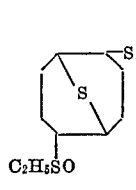
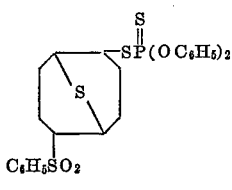

with a control 0% concentration, zero percent mortality was recorded with mites and Mexican bean beatles.

While there have been described various embodiments of the invention, the compositions and methods described are not intended to be understood as limiting the scope of the invention as it is realized that changes therewith are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A compound of the formula

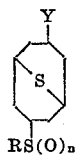

wherein:
R is selected from the group consisting of (1) alkyl of 1 to 20 carbon atoms; (2) hydrocarbon aryl of 6 to 18 carbon atoms; (3) hydrocarbon aryl of 6 to 18 carbon atoms or alkyl of 1 to 30 carbon atoms substituted by up to 3 halogen atoms and (4) hydrocarbon aryl of 6 to 18 carbon atoms substituted by alkyl of 1 to 20 carbon atoms;
$n$ is from 1 to 2
Y is selected from the group consisting of halogen and

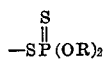

2. A compound in accordance with claim 1 wherein Y is chlorine, R is alkyl of from 1 to 6 carbon atoms and $n$ is 1.
3. A compound in accordance with claim 2 wherein $n$ is 2.
4. A compound of the formula

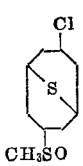

5. A compound of the formula

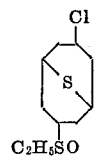

6. A compound of the formula

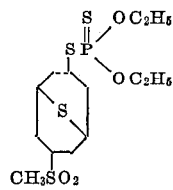

7. A process for the preparation of a compound of the formula

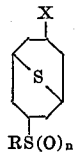

which comprises heating a compound of the formula

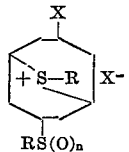

at about 100 degree centigrade up to about 300 degrees centigrade and isolating the product, wherein:
R is selected from the group consisting of (1) alkyl of 1 to 20 carbon atoms; (2) hydrocarbon aryl of 6 to 18 carbon atoms; (3) hydrocarbon aryl of 6 to 18 carbon atoms or alkyl of 1 to 30 carbon atoms substituted by up to 3 halogen atoms and (4) hydrocarbon aryl of 6 to 18 carbon atoms substituted by alkyl of 1 to 20 carbon atoms;
$n$ is from 1 to 2 and
X is halogen.

8. The process in accordance with claim 7 herein X is chlorine and R is an alkyl radical from 1 to 6 carbon atoms.

9. A process for the preparation of the compound of the formula

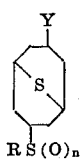

which comprises heating a compound of the formula

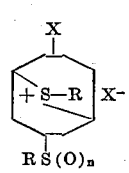

at about 100° C. up to about 300° C., isolating the product and subsequently thereafter reacting the product isolated with a compound of the formula

at a temperature from about 30° C. up to about 100° C.

wherein:
R is selected from the group consisting of (1) alkyl of 1 to 20 carbon atoms; (2) hydrocarbon aryl of 6 to 18 carbon atoms; (3) hydrocarbon aryl of 6 to 18 carbon atoms or alkyl of 1 to 30 carbon atoms substituted by up to 3 halogen atoms and (4) hydrocarbon aryl of 6 to 18 carbon atoms substituted by alkyl of 1 to 20 carbon atoms;
$n$ is from 1 to 2
X is halogen
Y is

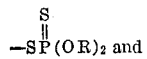

Z is an alkali metal.
10. A process in accordance with claim 9 wherein the alkali metal is sodium.

11. A compound of the formula:

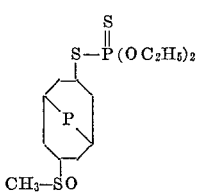

References Cited
UNITED STATES PATENTS 3,365,465  1/1968  Greenbaum _____ 260—327

JAMES A. PATTEN, Primary Examiner

U.S. Cl. X.R.
260—999

PO-1050
(5/69)

UNITED STATES PATENT OFFICE
CERTIFICATE OF CORRECTION

Patent No. 3,488,361     Dated January 6, 1970

Inventor(s) - Sheldon B. Greenbaum

It is certified that error appears in the above-identified patent and that said Letters Patent are hereby corrected as shown below:

Column 2, line 50, delete second formula and insert

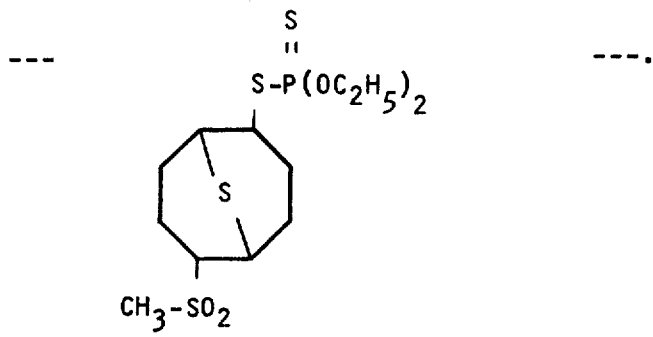

Column 2, line 57, delete second formula and insert

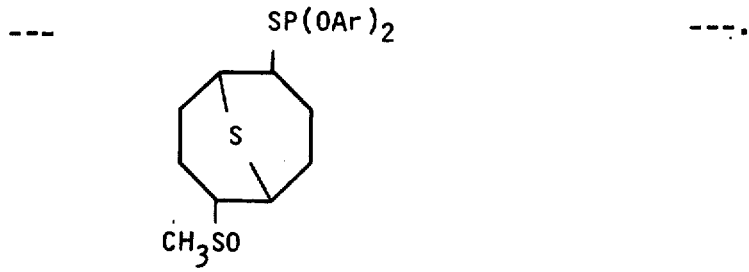

Column 3, line 5, delete formula and insert

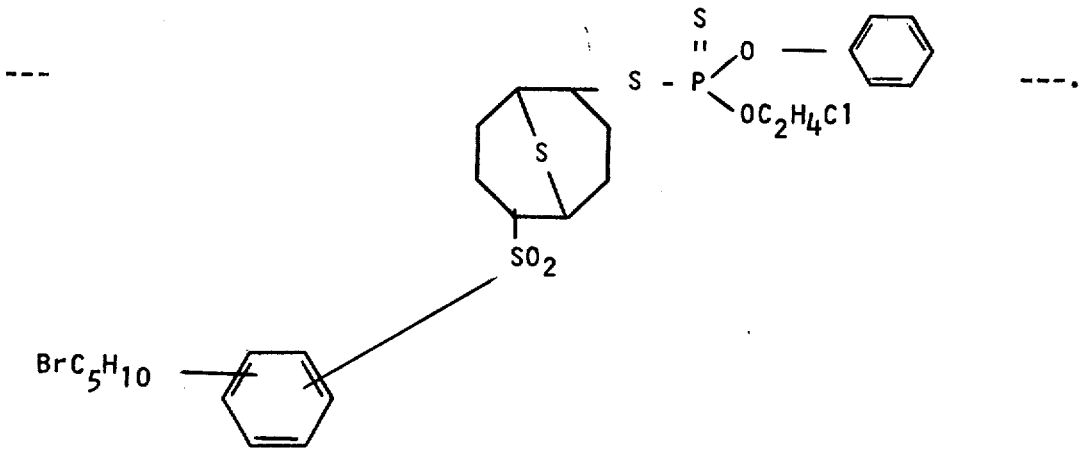

UNITED STATES PATENT OFFICE
CERTIFICATE OF CORRECTION

Patent No. 3,488,361                Dated  January 6, 1970

Inventor(s)  Sheldon B. Greenbaum              PAGE - 2

It is certified that error appears in the above-identified patent and that said Letters Patent are hereby corrected as shown below:

Column 3, line 45, delete formula and insert

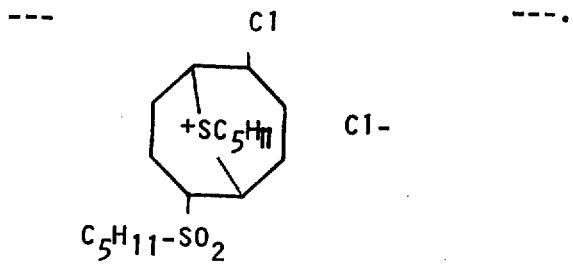

Column 3, line 56, delete "about 300 degrees centigrade" and insert --- to about 300 degrees centigrade ---.

Column 8, Claim 7, line 35, delete " 100 degree" and insert --- 100 degrees ---.

Column 10, Claim 11, line 5, delete formula and insert

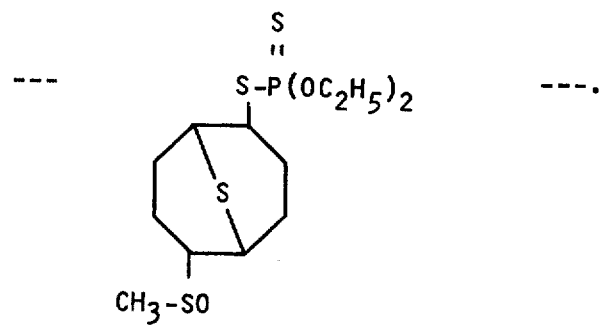

signed and sealed
NOV. 8, 1970

(SEAL)
Attest:

Edward M. Fletcher, Jr.
Attesting Officer

WILLIAM E. SCHUYLER, JR.
Commissioner of Patents